(12) United States Patent
Sun

(10) Patent No.: US 9,917,697 B2
(45) Date of Patent: Mar. 13, 2018

(54) PERFORMING INCREMENTAL UPGRADE ON APK BASE FILE CORRESPONDING TO APK EIGENVALUE VALUE

(71) Applicant: UC MOBILE CO., LTD., Beijing (CN)

(72) Inventor: Xiaozhi Sun, Beijing (CN)

(73) Assignee: UC Mobile Co., Ltd., Beijing (CN)

( * ) Notice: Subject to any disclaimer, the term of this patent is extended or adjusted under 35 U.S.C. 154(b) by 0 days.

(21) Appl. No.: 15/318,896

(22) PCT Filed: Oct. 10, 2014

(86) PCT No.: PCT/CN2014/088296
§ 371 (c)(1),
(2) Date: Dec. 14, 2016

(87) PCT Pub. No.: WO2015/196623
PCT Pub. Date: Dec. 30, 2015

(65) Prior Publication Data
US 2017/0141922 A1 May 18, 2017

(30) Foreign Application Priority Data
Jun. 25, 2014 (CN) .......................... 2014 1 0291429

(51) Int. Cl.
*H04L 9/00* (2006.01)
*H04L 9/32* (2006.01)
(Continued)

(52) U.S. Cl.
CPC ...... *H04L 9/3239* (2013.01); *G06F 17/30076* (2013.01); *G06F 17/30097* (2013.01); *G06F 21/6218* (2013.01)

(58) Field of Classification Search
CPC ............. H04L 9/3239; G06F 17/30097; G06F 17/30076; G06F 21/6218
(Continued)

(56) References Cited

U.S. PATENT DOCUMENTS 8,176,321 B1 * 5/2012 Perry ..................... G06F 21/53
713/167
2014/0066040 A1 3/2014 Zeng
(Continued)

FOREIGN PATENT DOCUMENTS

CN 102650947 A 8/2012
CN 102707977 A 10/2012
(Continued)

OTHER PUBLICATIONS

International Search Report and Written Opinion for Application No. PCT/CN2014/088296 dated Mar. 27, 2015.

*Primary Examiner* — Haresh N Patel
(74) *Attorney, Agent, or Firm* — Alston & Bird LLP

(57) ABSTRACT

The present invention provides an incremental upgrade method and system for a file. The method comprises: reading ZIP data information of an APK file, the ZIP data information being a ZIP data header and/or a ZIP directory table; acquiring an APK eigenvalue of the APK file according to the read ZIP data information; and performing incremental upgrade on an APK base file corresponding to the APK eigenvalue according to the APK eigenvalue. By means of the present invention, the efficiency of incremental upgrade can be improved while the calculation amount for acquiring an APK eigenvalue is reduced.

9 Claims, 2 Drawing Sheets

(51) Int. Cl.
*G06F 17/30* (2006.01)
*G06F 21/62* (2013.01)

(58) Field of Classification Search
USPC .......................................................... 713/165
See application file for complete search history.

(56) References Cited

U.S. PATENT DOCUMENTS

| | | | |
|---|---|---|---|
| 2014/0181973 A1* | 6/2014 | Lee | G06F 21/562 726/23 |
| 2015/0088967 A1* | 3/2015 | Muttik | G06F 21/55 709/203 |
| 2016/0004530 A1 | 1/2016 | Liang et al. | |

FOREIGN PATENT DOCUMENTS

| | | |
|---|---|---|
| CN | 102789506 A | 11/2012 |
| CN | 103051723 A | 4/2013 |
| CN | 103699408 A | 4/2014 |
| WO | WO 2014/012459 A1 | 1/2014 |

\* cited by examiner

PERFORMING INCREMENTAL UPGRADE ON APK BASE FILE CORRESPONDING TO APK EIGENVALUE VALUE

CROSS-REFERENCE TO RELATED APPLICATION

The present application claims a-priority to and the benefit of PCT/CN2014/088296, filed Oct. 10, 2014, which claims priority to and the benefit of the Chinese Patent Application No. 201410291429.0, which was filed with the State Intellectual Property Office (SIPO) of the People's Republic of China on Jun. 25, 2014, the entire contents of which are incorporated by reference to the present application.

TECHNICAL FIELD

The present invention relates to the technical field of mobile browser; and more specifically, it relates to an incremental upgrade method and system for file.

BACKGROUND ART

An APK (Android Package) eigenvalue is able to uniquely determine the version of an APK file as well as the base file thereof used in an incremental upgrading, in which the base file refers to the original file. The APK eigenvalue can be obtained through the APK version number. However, in some special cases, the eigenvalue cannot be directly obtained from the version number.

At present, typically it employs MD5 (Message-Digest Algorithm 5) or SHA (Secure Hash Algorithm)-1 and other traditional algorithms to carry out a calculation for the entire data of the APK file in order to obtain the APK eigenvalue of that file. However, for the purpose of commercial distribution, currently every APK developer, during the APK releasing process, adds certain special identifiers in APK in order to differentiate different distribution channels. As a result, due to the foregoing practice for APK, the traditional approaches for obtaining APK eigenvalue of an APK file become no longer applicable. This is because even if they share the same base file, with the addition of the special identifiers, they would become different APK files. In such a case, when using the traditional approach for obtaining APK eigenvalue to acquire the APK eigenvalue of an APK file, it may result in the problems as follows:

1. The calculation for obtaining APK eigenvalue is quite large, and the calculation efficiency is very low.

2. In general, an APK file may have thousands of distribution channels. Accordingly, even for the APK files of the same version, when they are added with different special identifiers, they essentially become thousands of different APK files; and as a result, they would have thousands of corresponding APK eigenvalues. It is noted that for those thousands of different APK files, a majority of their contents is exactly the same, and only a small number of data are different. However, if the thousands of different APK files are treated as different files in an incremental upgrading process, the background maintenance workload for the upgrading would be very huge.

SUMMARY OF THE INVENTION

In view of the problems mentioned above, one object of the present invention is to provide an incremental upgrade method and system for a file to solve the problems in the traditional approach for obtaining APK eigenvalue, namely a great amount of calculations, which further results in a huge background maintenance workload following the incremental upgrade. The present invention is able to reduce the amount of calculation necessary for obtaining APK eigenvalue; and at the same time, increase the efficiency of incremental upgrade.

In order to solve the technical problem mentioned above, the embodiments of the present invention disclose the technical solutions as follows:

In the first aspect, it provides a method for incremental upgrade, which comprises:

reading ZIP data information of an APK file, wherein the ZIP data information is a ZIP data header and/or a ZIP directory table;

acquiring an APK eigenvalue of the APK file according to the read ZIP data information; and performing an incremental upgrade on an APK base file corresponding to the APK eigenvalue according to the APK eigenvalue.

Concerning the above first aspect, in the first implementation approach for the first aspect, the step of acquiring an APK eigenvalue of the APK file according to the read ZIP data information comprises:

according to the read ZIP data information, filtering the N APK sub-files of the APK file, so as to obtain the APK sub-files that do not meet the filtering condition, wherein N is a natural number;

according to the ZIP data information of the APK sub-files that do not meet the filtering condition, acquiring the APK eigenvalues of the APK sub-files that do not meet the filtering condition.

In combination with the first implementation approach of the first aspect, the present invention also has a second implementation approach of the first aspect, during the process of filtering the N APK sub-files of the APK file, according to the names, sizes and creation times of the APK sub-files contained in the read ZIP data information, filtering the N APK sub-files.

In combination with the first implementation approach of the first aspect, the present invention also has a third implementation approach of the first aspect, during the process of filtering the N APK sub-files of the APK file to obtain the APK sub-files that do not meet the filtering condition, in the case when no APK sub-file that does not meet the filtering condition has been obtained, calculating the entire APK file through the MD5 or SHA-1 algorithm, so as to obtain the APK eigenvalue of the APK file.

In combination with the first aspect, the present invention also has a fourth implementation approach of the first aspect, during the process of acquiring the APK eigenvalue of the APK file according to the read ZIP data information, calculating based on the read ZIP data information through the MD5 or SHA-1 algorithm, so as to obtain the APK eigenvalue of the APK file.

In the second aspect, the present invention also provides a system for incremental upgrade, which comprises:

an information reading unit, which is used for reading the ZIP data information of an APK file, wherein the ZIP data information is a ZIP data header and/or a ZIP directory table;

an eigenvalue acquiring unit, which is used for acquiring an APK eigenvalue of the APK file according to the read ZIP data information; and an incremental upgrading unit, which is used for performing an incremental upgrade on an APK base file corresponding to the APK eigenvalue according to the APK eigenvalue.

Concerning the above second aspect, in the first implementation approach for the first aspect, the eigenvalue acquiring unit comprises:

a filtering subunit, which is used for, according to the ZIP data information read by the information reading unit, filtering the N APK sub-files of the APK file, so as to obtain the APK sub-files that do not meet the filtering condition, wherein N is a natural number;

an eigenvalue acquiring subunit, which is used for, according to the ZIP data information of the APK sub-files that do not meet the filtering condition, acquiring the APK eigenvalues of the APK sub-files that do not meet the filtering condition.

In combination with the first implementation approach of the second aspect, the present invention also has a second implementation approach of the second aspect, during the process in which the filtering subunit filters the APK sub-files in order to obtain the APK sub-files that do not meet the filtering condition, according to the names, sizes and creation times of the APK sub-files contained in the read ZIP data information that has been read by the information reading unit, filtering the N APK sub-files.

In combination with the first implementation approach of the second aspect, the present invention also has a third implementation approach of the second aspect, during the process in which the filtering subunit filters the N APK sub-files of the APK file in order to obtain the APK sub-files that do not meet the filtering condition, in the case when no APK sub-file that does not meet the filtering condition has been obtained by the filtering subunit, calculating the entire APK file through the MD5 or SHA-1 algorithm, so as to obtain the APK eigenvalue of the APK file.

In combination with the second aspect, the present invention also has a fourth implementation approach of the second aspect, during the process in which the eigenvalue acquiring unit acquires the APK eigenvalue of the APK file according to the ZIP data information read by the information reading unit, calculating through the MD5 or SHA-1 algorithm based on the ZIP data information read by the information reading unit, so as to obtain the APK eigenvalue of the APK file.

In the third aspect, the present invention also provides a computer-readable medium that comprises a processor-executable program code, wherein the program code causes a processor to perform the steps as follows:

reading ZIP data information of an APK file, wherein the ZIP data information is a ZIP data header and/or a ZIP directory table;

acquiring an APK eigenvalue of the APK file according to the read ZIP data information; and performing an incremental upgrade on an APK base file corresponding to the APK eigenvalue according to the APK eigenvalue.

By virtue of the incremental upgrade method and system for file provided in the present invention, a calculation is performed to acquire the APK eigenvalue of an APK file based on the read ZIP data information (the ZIP data information is a ZIP data header and/or a ZIP directory table) of the APK file; and then an incremental upgrade is performed on an APK base file corresponding to the APK eigenvalue according to the acquired APK eigenvalue. That is to say, by way of a calculation on the ZIP data header information that contains the original information of the APK file or the directory table that has been stored at the end of the ZIP, it is able to obtain the eigenvalue that can accurately present the property of the entire file, and then based on the foregoing obtained eigenvalue, it can perform an incremental upgrade on the corresponding base file. By means of the present invention, the efficiency of incremental upgrade can be improved while the amount of calculation for acquiring an APK eigenvalue is reduced.

In order to achieve the foregoing and related objects of the present invention, the one or more aspects of the present invention include the features that will be described in detail later and particularly recited in the claims of the present application. The following description and the accompanying drawings describe in detail certain exemplary aspects of the present invention. However, these aspects only describe a few examples of the various embodiments that may be carried out based on the principles of the present invention. Furthermore, the present invention is intended to include all such aspects and their equivalents.

BRIEF DESCRIPTION OF DRAWINGS

The accompanying drawings that form a portion of the present application help further understanding the present invention. The exemplary embodiments of the present invention and the description thereof are intended to describe the present invention, rather than limit the scope of the present invention. In the drawings.

In order to describe the respective technical solutions in the embodiments of the present invention or in the prior art, the drawings that will be used in the description for the embodiments of the present invention or in the prior art will be briefly described below. Obviously, to those of ordinary skill in the art, other drawings could be obtained based on these drawings with no need for any creative work.

DESCRIPTION OF THE EMBODIMENTS

The specific embodiments of the present invention will be further described in detail in reference to the accompanying drawings.

In order to address the problem that a great amount of calculation is traditionally needed to obtain the APK eigenvalue, which further results in a huge background maintenance workload following the incremental upgrade, the present invention performs a calculation on the read ZIP (compression algorithm of computer file) data information (the ZIP data information is a ZIP data header and/or a ZIP directory table) of an APK file to obtain the APK eigenvalue of the APK file; and then performs an incremental upgrade on an APK base file corresponding to the APK eigenvalue according to the obtained APK eigenvalue. By means of the present invention, the efficiency of incremental upgrade can be improved while the calculation amount for acquiring an APK eigenvalue is reduced.

In order to facilitate understanding of the present invention, before describing the present invention in detail, the inventive idea of the present invention will be briefly described first.

The ultimate goal of the present invention is to incrementally upgrade an APK file. The structure of an APK file is a standard ZIP compression structure. A ZIP file is characterized by compressing file data and then adding a ZIP data header thereto. The ZIP data header records the original information of the file; for example, file creation time, file name, original size of the file, size of the compressed file, method of file compression, CRC checking information of the file, and the like.

In a ZIP file, the files are one by one and sequentially saved in a file, and then a ZIP directory table is added at the end of the ZIP file. This directory table records all the ZIP data header offsets and some original file information similar to that in the ZIP data header. That is to say, the ZIP directory table records information about which files are included in the ZIP file and the specific locations of these files in the ZIP file.

Moreover, an APK eigenvalue is able to uniquely determine the version of an APK file as well as the base file thereof used in an incremental upgrade. Accordingly, by virtue of the foregoing features, the present invention has selected the ZIP data header information that contains the original information of the APK file or the directory table that has been stored at the end of the ZIP to perform the calculation, so as to obtain the eigenvalue that is able to represent the entire file property.

Figure 1:
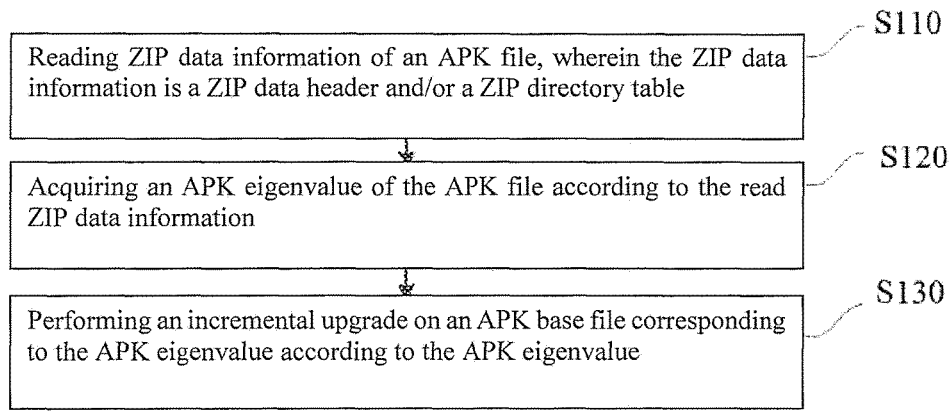
FIG. 1 is a schematic view of the first flow chart of the incremental upgrade method for a file according to a certain embodiment of the present invention.

In order to describe the incremental upgrade method for a file provided in the present invention, FIG. 1 shows the first flow chart of the incremental upgrade method for a file according to a certain embodiment of the present invention.

As shown in FIG. 1, the incremental upgrade method for a file provided in the present invention comprises:

S110: reading ZIP data information of an APK file, wherein the ZIP data information may include a ZIP data header, or include a ZIP directory table, or may include both a ZIP data header and a ZIP directory table.

Specifically, as mentioned above, since the similar original information of an APK file is saved in both the ZIP data header and the ZIP directory table, regardless of using the ZIP data header or using the ZIP directory table, or using both the ZIP data header and the ZIP directory table, the eigenvalue that is able to represent the entire file property can be accurately obtained through the calculation.

S120: acquiring an APK eigenvalue of the APK file according to the read ZIP data information.

In the foregoing process, an APK file is formed by N APK sub-files according to certain rules, wherein N is a natural number. In this context, the step of acquiring the APK eigenvalue of the APK file according to the read ZIP data information comprises: according to the read ZIP data information, filtering the N APK sub-files of the APK file, so as to obtain the APK sub-files that do not meet the filtering condition, wherein N is a natural number; and then according to the ZIP data information of the APK sub-files that do not meet the filtering condition, acquiring the APK eigenvalues of the APK sub-files that do not meet the filtering condition. In the foregoing process, during the process of acquiring the APK eigenvalue of the APK file according to the read ZIP data information, a calculation is performed on the read ZIP data information through the MD5 or SHA-1 algorithm, so as to acquire the APK eigenvalue of the APK file.

That is to say, prior to obtaining the APK eigenvalues of the APK sub-files which do not meet the filtering condition, a determination needs to be performed for the N APK sub-files to determine whether they can meet the file filtering condition. According to the read ZIP data information, filter the N APK sub-files of the APK file, so as to obtain the APK sub-files that do not meet the filtering condition. In addition, in the process of filtering the N APK sub-files of the APK file to obtain the APK sub-files that do not meet the filtering condition, if there is no APK sub-file that does not meet the filtering condition (that is to say, all of the N APK sub-files meet the filtering condition), then calculate the entire APK file through the MD5 or SHA-1 algorithms, so as to obtain the APK eigenvalue of the APK file.

Namely, in the case that all of the N APK sub-files meet the filtering condition, a traditional approach will be employed to calculate the entire APK file using the MD5 or SHA-1 algorithm in order to obtain the APK eigenvalue of the APK file. On the other hand, if there is an APK sub-file(s) that do not meet the filtering condition, then a calculation is performed on the read ZIP data information of the APK sub-file(s) that do not meet the filtering condition through the MD5 or SHA-1 algorithm, so as to acquire the APK eigenvalue of the APK sub-file(s) that do not meet the filtering condition.

It is noted that due to the distribution characteristics of the APK file, although many APK files are not completely identical, the differences between these APK files are actually predictable. As a result, if these differences result from the amendment of one or a limited number of sub-files, during the process of obtaining the APK eigenvalues thereof, removal of the sub-files which result in these differences can avoid these differences. Moreover, in the case that those differences result from the data provided at the end of the ZIP directory table, a determination on the APK file can avoid those differences as well.

That is to say, because the APK sub-files that can meet the file filtering condition are actually those small number of files which are already known to have differences, certain features, such as file names, sizes or creation times of the APK sub-files can be used as the file filtering condition to determine the APK sub-files. Filtering the N APK sub-files of the APK file according to the names, sizes and creation times of the APK sub-files filter the APK sub-files. In this process, the APK sub-file information includes the names of the APK sub-files, sizes of the APK sub-files and creation times of the APK sub-files.

Moreover, due to the APK file differences resulting from various distribution channels, it could be deemed that these APK files are from the same version, and a majority of their contents are the same. As a result, during the process of incremental upgrade, the incremental upgrade can be performed only for those identical parts (in other words, the APK sub-files that do not meet the filtering condition), while for those small number of different parts (in other words, the APK sub-files that meet the filtering condition), they could be deemed as newly added data, and thus can be treated in a full increase. In this way, the present invention is able to solve the problem of many versions needing to be maintained. This is exactly the valuable practical benefit from the APK eigenvalue.

S130: performing an incremental upgrade on an APK base file corresponding to the APK eigenvalue according to the APK eigenvalue.

More specifically, due to the fact that one APK eigenvalue represents one individual APK base file, the incremental upgrading process can be accomplished with the base file corresponding to the APK eigenvalue.

Figure 2:
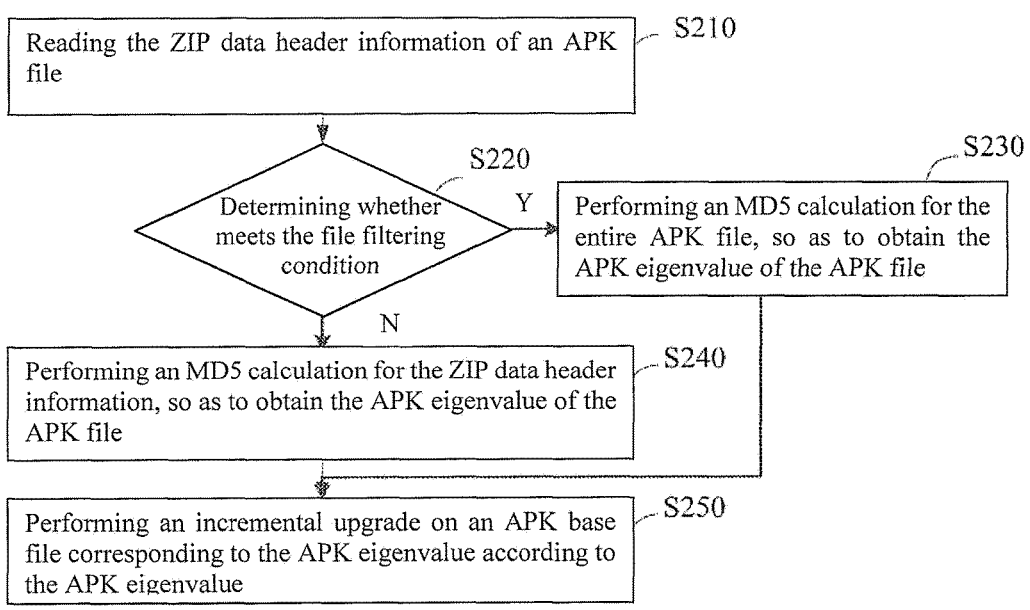
FIG. 2 is a schematic view of the second flow chart of the incremental upgrade method for a file according to a certain embodiment of the present invention.

In addition, in order to describe the method for incremental upgrade of a file provided in the present invention in more detail, FIG. 2 shows the second flow chart of the incremental upgrade method for a file according to a certain embodiment of the present invention. As shown in FIG. 2:

S210: reading the ZIP data header information of an APK file;

S220: according to the read ZIP data header information, determining whether the APK file meets the file filtering condition, if it meets the file filtering condition, then proceed to step S230, if it does not, then proceed to step S240.

More specifically, the specific procedure regarding how to determine whether an APK file meets the file filtering condition has already been described in detail in the first flow chart, which thus will not be repeated again herein.

S230: performing an MD5 calculation for the entire APK file, so as to obtain the APK eigenvalue of the APK file, and then proceed to S250.

S240: performing an MD5 calculation for the ZIP data header information, so as to obtain the APK eigenvalue of the APK file. That is to say, the MD5 calculation is only performed with the ZIP data header information to obtain the APK eigenvalue of the APK file.

S250: performing an incremental upgrade on an APK base file corresponding to the APK eigenvalue according to the APK eigenvalue.

It can be seen from the flow charts shown in FIG. 1 and FIG. 2 that the incremental upgrade method for a file provided in the present invention first performs a calculation on the read ZIP data information of an APK file to obtain the APK eigenvalue of the APK file, and then performs an incremental upgrade on an APK base file corresponding to the APK eigenvalue according to the APK eigenvalue. In this way, it is able to reduce the calculation amount for acquiring an APK eigenvalue, and at the same time, improve the efficiency of incremental upgrade.

The beneficial effects of the incremental upgrade method for a file provided in the present invention will be further described in reference to a few examples.

Example 1

There are three APK files, and their versions are 9.7.0, 9.7.1 and 8.9, respectively. Upon reading the ZIP data information of the three APK files, it is pretty clear that version 8.9 could be filtered off based on the read ZIP data information, because version 8.9 is apparently different from versions 9.7.0 and 9.7.1.

Next, suppose that with different distribution channels, version 9.7.0 becomes 9.7.0-1 to 9.7.0-100; while version 9.7.1, with different distribution channels, becomes 9.7.1-1 to 9.7.1-100. In addition, all of the foregoing versions need to be upgraded to version 9.8.0. Based on the traditional method, the 200 APK eigenvalues need to be calculated during the process of incremental upgrade; in addition, since the 200 APK eigenvalues have 200 corresponding APK base files, there will be 200 files with incremental differences to be generated based on these APK base files. As a result, the workload of background maintenance will be huge.

However, when employing the incremental upgrade method for a file provided in the present invention, it is only necessary to calculate the APK eigenvalues of two APK files (namely, version 9.7.0 and version 9.7.1). Accordingly, there are only 2 corresponding APK base files. As a result, there are only 2 files with incremental differences to be generated based on the two APK base files.

In practice, based on certain browser experience surveys, it is known that the number of distribution channels for APK file is close to 10,000. That is to say, in a case when there are two versions that need to be upgraded, 20,000 different files will need to be generated. On the other hand, when employing the incremental upgrade method for a file provided in the present invention, there will be only one differentiation file to be generated for each version. In other words, the number of files to be generated is not related to the number of distribution channels anymore. Therefore, in the case when two versions need incremental upgrade, it is necessary to generate two different files. In this way, the present invention is able to reduce the calculation amount for acquiring an APK eigenvalue, and at the same time, improve the efficiency of incremental upgrade.

Example 2

Using the release and distribution of Android as an example, based on the traditional method, when calculating the APK eigenvalues for the whole APK file, in the case when a version has hundreds of channel packages, an incremental upgrade will need hundreds of original files for incremental upgrade. As a result, the workload of background maintenance for incremental upgrade will be huge.

Suppose there are nearly 3000 APK files, while only 4 files are different between the channel promotion packages and the basic packages on the official website of the same version. In such a case, the file names of the 4 files can be used as the filtering condition. When employing the incremental upgrade method for a file provided in the present invention, following removal of the 4 different files, the calculated APK eigenvalues of various channel packages and the calculated APK eigenvalues of the basic packages on the official website are exactly the same. As a result, in an incremental upgrade, only one incremental original file needs to be maintained; in addition, the 4 different files will be deemed as newly added files for an incremental upgrade treatment. In this way, the entire incremental upgrade is accomplished.

The incremental upgrade method for a file provided in the present invention can improve the coverage of incremental upgrade from the original less than about 10% to the currently nearly 70%. From the point of view of efficiency, the amount of data for calculating the APK eigenvalues of the whole APK file is about 13M, while the amount of data for calculating the APK eigenvalues with the ZIP data header information is close to about 300K. Accordingly, the present invention is able to greatly improve the efficiency of APK eigenvalue calculation. In the case of an MD5 calculation for all the data in an APK file of 50M, its operation time on a mid-level mobile phone is about 2 seconds. However, when employing the incremental upgrade method for a file provided in the present invention, it only needs about 0.8 seconds. Apparently, the present invention is able to improve the calculation efficiency for APK eigenvalues, which then helps to improve the efficiency of incremental upgrade.

Figure 3:
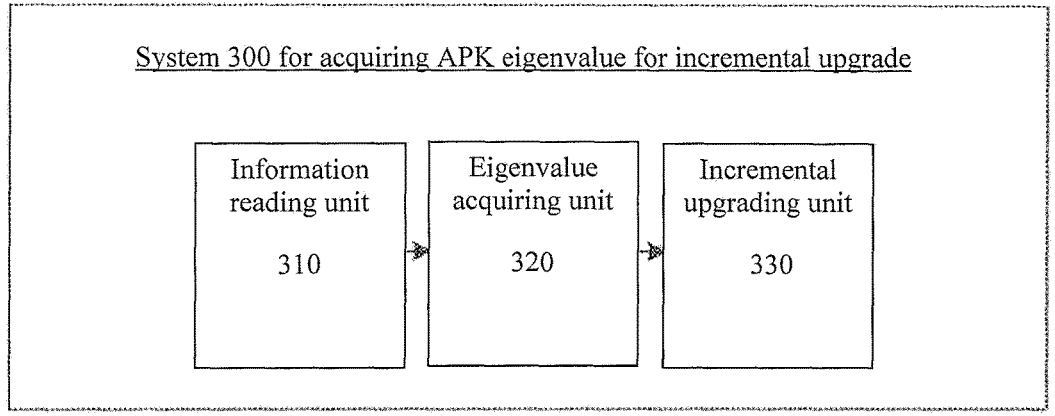
FIG. 3 is the first logic block diagram of the incremental upgrade method for a file according to a certain embodiment of the present invention.

Corresponding to the method described above, the present invention also provides a system for incremental upgrade for a file. FIG. 3 shows the first logic block diagram of the incremental upgrade method for a file according to a certain embodiment of the present invention.

As shown in FIG. 3, the system for incremental upgrade for a file 300 provided in the present invention comprises an information reading unit 310, an eigenvalue acquiring unit 320 and an incremental upgrading unit 330.

The information reading unit 310 is used for reading the ZIP data information of an APK file, wherein the ZIP data information is a ZIP data header and/or a ZIP directory table.

Specifically, as mentioned above, since the similar original information of an APK file is saved in both the ZIP data header and the ZIP directory table, regardless of using the ZIP data header or using the ZIP directory table, or using both the ZIP data header and the ZIP directory table, the eigenvalue that is able to represent the entire file property can be accurately obtained through the calculation.

The eigenvalue acquiring unit 320 is used for acquiring an APK eigenvalue of the APK file according to the read ZIP data information.

Figure 4:
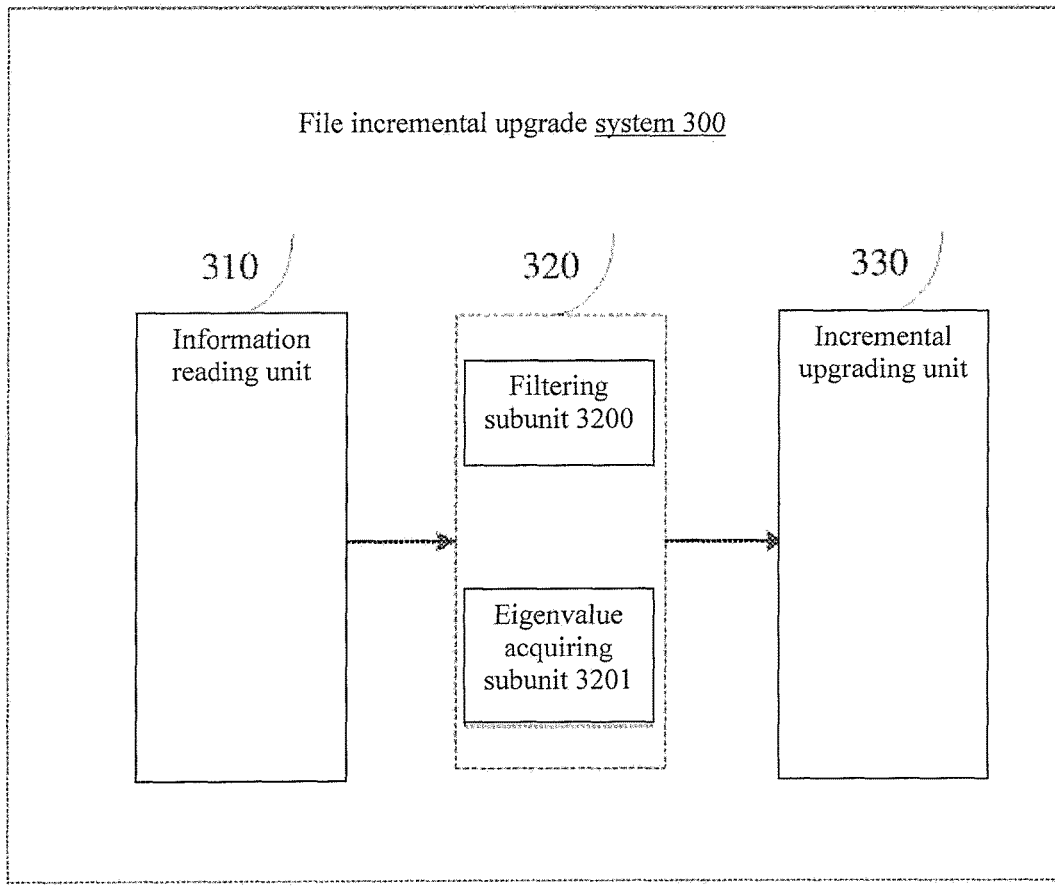
FIG. 4 is the second logic block diagram of the incremental upgrade method for a file according to a certain embodiment of the present invention.

Moreover, prior to obtaining the APK eigenvalue of the APK file, a determination needs to be performed for the APK file to determine whether the file can meet the file filtering condition. Accordingly, the eigenvalue acquiring unit 320 according to the present invention may comprise: a filtering subunit 3200 and an eigenvalue acquiring subunit 3201, please refer to FIG. 4 for more details. The filtering subunit 3200 is used for, according to the ZIP data information read by the information reading unit 310, filtering the N APK sub-files of the APK file, so as to obtain the APK sub-files that do not meet the filtering condition, wherein N is a natural number; and the eigenvalue acquiring subunit 3201 is used for, according to the ZIP data information of the APK sub-files that do not meet the filtering condition, acquiring the APK eigenvalues of the APK sub-files that do not meet the filtering condition. In addition, during the process in which the eigenvalue acquiring unit 320 acquires the APK eigenvalue of the APK file according to the ZIP data information read by the information reading unit 310, a calculation is performed through the MD5 or SHA-1 algorithm based on the ZIP data information read by the information reading unit 310, so as to obtain the APK eigenvalue of the APK file.

That is to say, prior to obtaining the APK eigenvalue of the APK file, a determination needs to be performed for the APK file to determine whether it can meet the file filtering condition. According to the read ZIP data information, filter the APK file, so as to obtain the APK sub-files that do not meet the filtering condition. In addition, in the process of filtering the APK sub-files of the APK file by the filtering subunit 3200 to obtain the APK sub-files that do not meet the filtering condition, if there is no APK sub-file that does not meet the filtering condition, that is to say, all of the N APK sub-files meet the filtering condition, then calculate the entire APK file through the MD5 or SHA-1 algorithm, so as to obtain the APK eigenvalue of the APK file.

Namely, in the case when all of the N APK sub-files meet the filtering condition, a traditional approach will be employed to calculate the entire APK file through the MD5 or SHA-1 algorithm in order to obtain the APK eigenvalue of the APK file. On the other hand, if there is an APK sub-file(s) that do not meet the filtering condition, then a calculation is performed on the read ZIP data information of the APK sub-file(s) that do not meet the filtering condition through the MD5 or SHA-1 algorithm, so as to acquire the APK eigenvalue of the APK sub-file(s) that do not meet the filtering condition.

In addition, in the process of filtering the N APK sub-files of the APK file by using the filtering subunit 3200, the N APK sub-files are filtered according to the name, size or creation time of the APK sub-files contained in the ZIP data information read by the information reading unit 310.

The incremental upgrading unit 330 is used for performing an incremental upgrade on an APK base file corresponding to the APK eigenvalue according to the APK eigenvalue.

Corresponding to the method and system described above, the present invention also provides a computer-readable medium that comprises a processor-executable program code, wherein the program code causes a processor to perform the steps as follows:

reading ZIP data information of an APK file, wherein the ZIP data information is a ZIP data header and/or a ZIP directory table;

acquiring an APK eigenvalue of the APK file according to the read ZIP data information; and performing an incremental upgrade on an APK base file corresponding to the APK eigenvalue according to the APK eigenvalue.

In light of the foregoing, it could be known that by way of using a processor to execute the program code, the present invention is able to reduce the calculation amount for acquiring an APK eigenvalue, and at the same time, improve the efficiency of incremental upgrade.

The method and system of incremental upgrade for a file provided in the present invention have been described with examples and in reference to the accompanying drawings. However, those skilled in the art can clearly understand that for the method and system of incremental upgrade for a file provided in the present invention, a lot of modifications can be made without departing from the technical contents of the present invention. Therefore, the scope of the present invention should be defined by the appended claims.

Furthermore, through the embodiments described above, those skilled in the art can clearly understand that the technology disclosed in the embodiments of the present invention can be implemented by software plus a necessary universal hardware platform. Of course it may be implemented by hardware; while in most cases, it is preferred to be implemented through the former mode. Based on this understanding, the technical solution of the present invention is essentially the form of a software product, or the part contributing to the prior art may be embodied in the form of a software product. The computer software product may be stored in a storage medium, which includes a number of instructions to make a computer device (a personal computer, server, or network equipment) perform the method of the embodiments of the present invention, or some portions of the embodiments of the present invention. In addition, the aforementioned storage medium includes Read-only memory (ROM), Random Access Memory (RAM), magnetic disk, optical disk, and other forms of media that can store program codes.

What is claimed is:

1. An incremental upgrade method for a file, comprising:
reading ZIP data information of an APK file, wherein the ZIP data information is a ZIP data header and/or a ZIP directory table;
acquiring an APK eigenvalue of the APK file according to the ZIP data information, wherein acquiring the APK eigenvalue of the APK file according to the ZIP data information comprises:
filtering APK sub-files of the APK file, according to the ZIP data information, to obtain APK sub-files that do not meet one or more filtering conditions according to name, size or creation time of the APK sub-files contained in the ZIP data information; and performing a calculation on the ZIP data information of the obtained APK sub-files that do not meet the filtering condition to obtain the APK eigenvalue of the APK file; and performing an incremental upgrade on an APK base file corresponding to the APK eigenvalue according to the APK eigenvalue.

2. The incremental upgrade method for a file as set forth in claim 1, wherein acquiring the APK eigenvalue of the APK file according to the ZIP data information comprises:

according to the ZIP data information, filtering N APK sub-files of the APK file to obtain the APK sub-files that do not meet the filtering condition, wherein N is a natural number; and according to the ZIP data information of the APK sub-files that do not meet the filtering condition, acquiring APK eigenvalues of the APK sub-files that do not meet the filtering condition.

3. The incremental upgrade method for a file as set forth in claim 2, wherein filtering the N APK sub-files of the APK file to obtain the APK sub-files that do not meet the filtering condition comprises:

when no APK sub-file does not meet the filtering condition, calculating the APK file through a MD5 or SHA-1 algorithm to obtain the APK eigenvalue of the APK file.

4. The incremental upgrade method for a file as set forth in claim 1, wherein acquiring an APK eigenvalue of the APK file according to the ZIP data information comprises:

calculating based on the ZIP data information through a MD5 or SHA-1 algorithm to obtain the APK eigenvalue of the APK file.

5. An apparatus comprising a processor and a non-transitory memory including computer program code, the non-transitory memory and computer program code configured to, with the processor, cause the apparatus to:

read ZIP data information of an APK file, wherein the ZIP data information is a ZIP data header and/or a ZIP directory table;

acquire an APK eigenvalue of the APK file according to the ZIP data information, wherein acquiring the APK eigenvalue of the APK file according to the ZIP data information further causes the apparatus to:

filter APK sub-files of the APK file, according to the ZIP data information, to obtain APK sub-files that do not meet one or more filtering conditions according to name, size or creation time of the APK sub-files contained in the ZIP data information; and perform a calculation on the ZIP data information of the obtained APK sub-files that do not meet the filtering condition to obtain the APK eigenvalue of the APK file; and perform an incremental upgrade on an APK base file corresponding to the APK eigenvalue according to the APK eigenvalue.

6. The apparatus according to claim 5, wherein the non-transitory memory and computer program code are further configured to, with the processor, cause the apparatus to:

according to the ZIP data information, filter N APK sub-files of the APK file to obtain the APK sub-files that do not meet filtering condition, wherein N is a natural number; and according to the ZIP data information of the APK sub-files that do not meet the filtering condition, acquire APK eigenvalues of the APK sub-files that do not meet the filtering condition.

7. The apparatus according to claim 6, wherein filtering the N APK sub-files of the APK file to obtain the APK sub-files that do not meet filtering condition further causes the apparatus to:

when no APK sub-file does not meet the filtering condition by the filtering subunit, calculate the APK file through a MD5 or SHA-1 algorithm to obtain the APK eigenvalue of the APK file.

8. The apparatus according to claim 5, wherein the non-transitory memory and computer program code are further configured to, with the processor, cause the apparatus to:

calculate through a MD5 or SHA-1 algorithm based on the ZIP data information read by the information reading unit to obtain the APK eigenvalue of the APK file.

9. A system, comprising a server in communication with a network, the server comprising at least one processor and at least one non-transitory memory including computer program code, the at least one non-transitory memory and the computer program code configured to, with the at least one processor, cause the server to:

read ZIP data information of an APK file, wherein the ZIP data information is a ZIP data header and/or a ZIP directory table;

acquire an APK eigenvalue of the APK file according to the ZIP data information wherein acquiring the APK eigenvalue of the APK file according to the ZIP data information further causes the server to:

filter APK sub-files of the APK file, according to the ZIP data information, to obtain APK sub-files that do not meet one or more filtering conditions according to name, size or creation time of the APK sub-files contained in the ZIP data information; and perform a calculation on the ZIP data information of the obtained APK sub-files that do not meet the filtering condition to obtain the APK eigenvalue of the APK file; and perform an incremental upgrade on an APK base file corresponding to the APK eigenvalue according to the APK eigenvalue.

* * * * *